US011368656B2

(12) United States Patent
Molinari et al.

(10) Patent No.: US 11,368,656 B2
(45) Date of Patent: Jun. 21, 2022

(54) SYSTEM FOR CONTROLLING LINEAR AXIS OF A MEMS MIRROR

(71) Applicant: STMICROELECTRONICS S.r.l., Agrate Brianza (IT)

(72) Inventors: Luca Molinari, Piacenza (IT); Daniele D'Elia, Pavia (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 0 days.

(21) Appl. No.: 17/356,162

(22) Filed: Jun. 23, 2021

(65) Prior Publication Data
US 2021/0409661 A1    Dec. 30, 2021

(30) Foreign Application Priority Data

Jun. 24, 2020    (IT) ........................ 102020000015178

(51) Int. Cl.
*H04N 9/31* (2006.01)
*H04N 5/06* (2006.01)
*G06T 7/50* (2017.01)
*G02B 26/08* (2006.01)

(52) U.S. Cl.
CPC ....... *H04N 9/3135* (2013.01); *G02B 26/0833* (2013.01); *G06T 7/50* (2017.01); *H04N 5/06* (2013.01); *H04N 9/3141* (2013.01); *H04N 9/3188* (2013.01); *G06T 2207/10016* (2013.01)

(58) Field of Classification Search
CPC ...... H04N 9/3135; H04N 9/3188; H04N 5/06; H04N 9/3141; G02B 26/0833; G06T 7/50; G06T 2207/10016
USPC ............... 348/501, 744, 770, 771; 359/200.8
See application file for complete search history.

(56) References Cited

U.S. PATENT DOCUMENTS 8,248,541 B2 *   8/2012  Brown ................ G02B 26/085
                                                    359/200.8
2017/0195647 A1 *  7/2017  Honkanen ............ G03B 21/147
2020/0192083 A1    6/2020  Liao et al.

FOREIGN PATENT DOCUMENTS

WO    2011/002591 A2    1/2011

* cited by examiner

Primary Examiner — Sherrie Hsia
(74) Attorney, Agent, or Firm — Seed IP Law Group LLP

(57) ABSTRACT

A device has memory and processing circuitry coupled to the memory. The processing circuitry generates a resonant axis drive signal to drive a Micro Electro Mechanical System (MEMS) mirror system at a resonance frequency, and generates a linear axis drive signal to drive the MEMS mirror system at a linear frequency corresponding to a video frame rate. Generating the linear axis drive signal includes generating, using interpolation, a current set of shape values based on a stored set of shape values and an indication of the video frame rate. The linear axis drive signal is generated using the current set of shape values.

23 Claims, 9 Drawing Sheets

SYSTEM FOR CONTROLLING LINEAR AXIS OF A MEMS MIRROR

BACKGROUND

Technical Field

The present disclosure relates to the field of the Micro Electro Mechanical Systems (hereinafter referred to as "MEMS").

Description of the Related Art

Nowadays, MEMS mirror are widely used in Laser Beam Scanning (LSB) applications—such as Augmented Reality (AR), Virtual Reality (VR), 3D sensing, Light Detection and Ranging (LiDAR)—for steering a laser beam in a controlled way, in order to project or detect an image. In these applications, one or more MEMS mirror are driven to reflect a laser beam according to a raster scan pattern.

As it is well known to those skilled in the art, a MEMS mirror is a MEMS device comprising a mirror chip suspended over a substrate by means of torsion bars. Making for example reference to a piezo-electric MEMS mirror (but same considerations directly apply to other kinds of MEMS mirrors), the mirror chip rotates about a rotational axis in response to the application of suitable driving voltages or currents, accordingly changing the deflection angle thereof. Dual axis MEMS mirrors exists, configured to rotate about two different rotational axes.

MEMS mirrors are configured to operate according to a resonant mode when rotate about the so-called resonant axis, and/or are configured to operate according to a linear mode when rotate about the so-called linear axis (a dual axis MEMS mirror being capable of rotating about both the resonant and linear axis).

When a MEMS mirror operates in the resonant mode, the MEMS mirror oscillates about the resonant axis at a resonant frequency fr, causing a resonant deflection angle $\vartheta r$ of the mirror to oscillate in a resonant deflection angle interval Ir. The resonant frequency fr, as well as the resonant deflection angle interval Ir, depend on size, material and temperature of the MEMS mirror. The resonant mode allows a high-speed operation. However, the resonant frequency fr cannot be controlled, but it can be only tracked, since it depends on thermo mechanical behavior of the resonant axis. In order to drive a MEMS mirror in the resonant mode, either a sine-wave or a square-wave resonant axis driving signal RS is applied, oscillating at the resonant frequency fr of the MEMS mirror. In any case, even if a square-wave resonant axis driving signal is applied, the resonant deflection angle $\vartheta r$ oscillates following a sine wave due to the high mirror quality factor (Q).

When a MEMS mirror operates in the linear mode, the MEMS mirror oscillates about the linear axis at a linear frequency fl, lower than the resonant frequency fr, causing a linear deflection angle $\vartheta l$ of the mirror to oscillate in a linear deflection angle interval Il proportional to the waveform of a linear axis driving signal LS. In the linear mode, the linear deflection angle $\vartheta l$ can be controlled in a very accurate way, since the relationship between the linear axis driving signal LS oscillating at the linear frequency fl and the linear deflection angle $\vartheta l$ exhibits excellent linearity and reproducibility. However, the linear mode cannot allow a high-speed operation.

Making reference to an application in which (generally, rectangular) video frames $V(F(j))$ ($j=1, 2, \ldots$) generated by a video data signal have to be projected at a video frame rate Vf, each video frame is projected through raster scan carried out exploiting MEMS mirror. Each video frame is scanned along a horizontal direction and a vertical direction, exploiting a dual axis MEMS mirror or two single axis MEMS mirrors.

In order to drive one or more MEMS mirrors to perform a raster scan, a MEMS mirror is driven to move (e.g., oscillate):
- about its resonant axis for scanning along the horizontal direction; and
- about its linear axis for scanning along the vertical direction.

BRIEF SUMMARY

The Applicant has found that the known solutions for managing a linear axis driving signal LS which provides for having a linear frequency fl that is a submultiple of a resonance frequency fr are affected by drawbacks.

Indeed, it is very complicated to efficiently control the linear frequency fl since the resonant axis clock signal used by a DAC converter for generation of the linear axis driving signal may vary, forcing a continuous resampling of the values stored in a linear axis driving table.

Moreover, the solutions providing for increasing the number of scanning lines per each video frame through an increasing of the resonance frequency fr are very difficult to be implemented, because the control of a MEMS mirrors oscillating at high frequencies is a very complicated and expensive task.

Furthermore, the solutions providing for dynamically recalculating the values stored in the linear axis driving table at each video frame require the execution of a large number of Million of Instructions Per Second (MIPS).

In view of the above, the Applicant has devised a solution for solving or at least mitigating the drawbacks affecting the known solutions.

An aspect of the present disclosure relates to a system for driving at least one MEMS mirror adapted to steer a laser beam generated according to a video data signal for projecting video frames at a corresponding video frame rate Vf.

The at least one MEMS mirror is configured to rotate about a linear axis with a linear frequency fl and about a resonant axis with a resonant frequency fr.

The system comprises:
- a linear axis control module adapted to receive a sequence of digital values L(m) defining a preliminary shape version S of a signal segment SS(j) and to reshape said preliminary shape version S into a processed shape version S' by processing said digital values according to a video frame sync signal corresponding to a video synchronization defining the video frame rate Vf, said linear frequency fl being equal to the inverse of the time duration of said signal segment SS(j) having said processed shape version S'; and
- a MEMS mirror driving module configured to rotate said at least one MEMS mirror about the linear axis according to a linear axis driving signal being the periodical repetition, with a period equal to the inverse of the linear frequency fl, of said signal segment SS(j) having said processed shape version S', wherein
the linear axis control module is configured to reshape said preliminary shape version S into said processed shape version S' to adapt the linear frequency fl to a value matching the video frame rate Vf.

According to an embodiment of the present disclosure, the linear axis control module is configured to generate said processed shape version S' of the signal segment SS(j) in such a way to set the linear frequency fl to a value corresponding to the resonant frequency fr divided by a factor M', wherein said factor M' is a real number.

According to an embodiment of the present disclosure, the linear axis control module is configured to generate said processed shape version S' of the signal segment SS(j) by generating a corresponding sequence of processed digital values L(i)' defining said processed shape version S' through an interpolation of said digital values L(m). According to an embodiment of the present disclosure, the linear axis control module is further configured to calculate, at an edge of a clock signal oscillating at the resonant frequency fr or at an integer multiple of the resonant frequency fr, a processed digital value L(i)' from a group G(i) of digital values L(m) using an interpolation function IF interpolating said group G(i) of digital values L(m).

According to an embodiment of the present disclosure, the linear axis control module is configured to set a position P(i) across said interpolation function IF with respect to the group G(i) of digital values L(m) for calculating the processed digital value L(i)' according to an expansion ratio indicative of an expansion degree in terms of time duration of the processed shape version S' of the signal segment SS(j) with respect to the time duration of the preliminary shape version S of the signal segment SS(j).

According to an embodiment of the present disclosure, the system comprises:
- a video frame rate estimator module configured to receive said video frame sync signal and accordingly calculate a video frame rate measure indicative of a measure of an actual video frame rate Vf of the video data signal; and
- a ratio calculator module configured to calculate said expansion ratio according to said video frame rate measure.

According to an embodiment of the present disclosure, the linear axis control module is configured to set the time duration of the signal segment SS(j) having the processed shape version S' to a value corresponding to the time duration of the signal segment SS(j) having the preliminary shape version S' multiplied by the inverse of the expansion ratio.

According to an embodiment of the present disclosure, the signal segment SS(j) comprises:
- a trace segment corresponding to clock signal pulses during which the at least one MEMS mirror is moved for steering the laser beam in order to project scanning lines of a corresponding video frame; and
- a retrace segment corresponding to clock signal pulses during which a position of the at least one MEMS mirror about the linear axis is reset, wherein
said sequence of digital values L(m) defining the preliminary shape version S of the signal segment SS(j) comprises a first subsequence of digital values L(m) corresponding to the trace segment and a second subsequence of digital values L(m) corresponding to the retrace segment.

According to an embodiment of the present disclosure, the ratio calculator module is configured to set said expansion ratio to one during clock signal pulses corresponding to the trace segment.

According to an embodiment of the present disclosure, the ratio calculator module is configured to set said expansion ratio to a ratio between:

- a number of digital values L(m) of the first subsequence of digital values L(m); and
- said number of digital values L(m) of the first subsequence of digital values L(m) minus a frequency error correction term FCT indicative of an offset between the linear frequency fl and the video frame rate Vf, during clock signal pulses corresponding to the retrace segment.

According to an embodiment of the present disclosure, said frequency error correction term FCT is equal to said number of digital values L(m) of the first subsequence of digital values L(m) minus said video frame rate measure.

According to an embodiment of the present disclosure, the linear axis control module comprises:
- a fractional counter module configured to calculate a base counter BC that is incremented at each clock signal pulse by a value corresponding to an actual value of the expansion ratio, and to output at each clock signal pulse a corresponding first counter value corresponding to the integer part of the base counter BC and a corresponding second counter value corresponding to the fractional part of the base counter BC; and
- an interpolator module configured to select at each clock signal said group G(i) of digital values L(m) among the sequence of digital values L(m) according to said first counter value, and to calculate a corresponding processed digital value L(i)' using said interpolation function IF interpolating said group G(i) of digital values L(m) by setting said position P(i) across said interpolation function IF with respect to the group G(i) of digital values L(m) according to said second counter value.

Another aspect of the present disclosure relates to a laser beam scanning system comprising:
- a laser module configured to generate a laser beam;
- a laser drive module configured to drive the laser module according to a video data signal;
- at least one MEMS mirror adapted to steer said laser beam for projecting video frames at a corresponding video frame rate Vf, and
- a system for driving said at least one MEMS mirror.

BRIEF DESCRIPTION OF THE SEVERAL VIEWS OF THE DRAWINGS

These and others features and advantages of various solutions according to the present disclosure will be better understood by reading the following detailed description of example embodiments thereof, provided merely by way of non-limitative example, to be read in conjunction with the attached drawings. On this regard, it is explicitly intended that the drawings are simply used for conceptually illustrating the described structures and procedures. Particularly.

DETAILED DESCRIPTION

Figure 1:
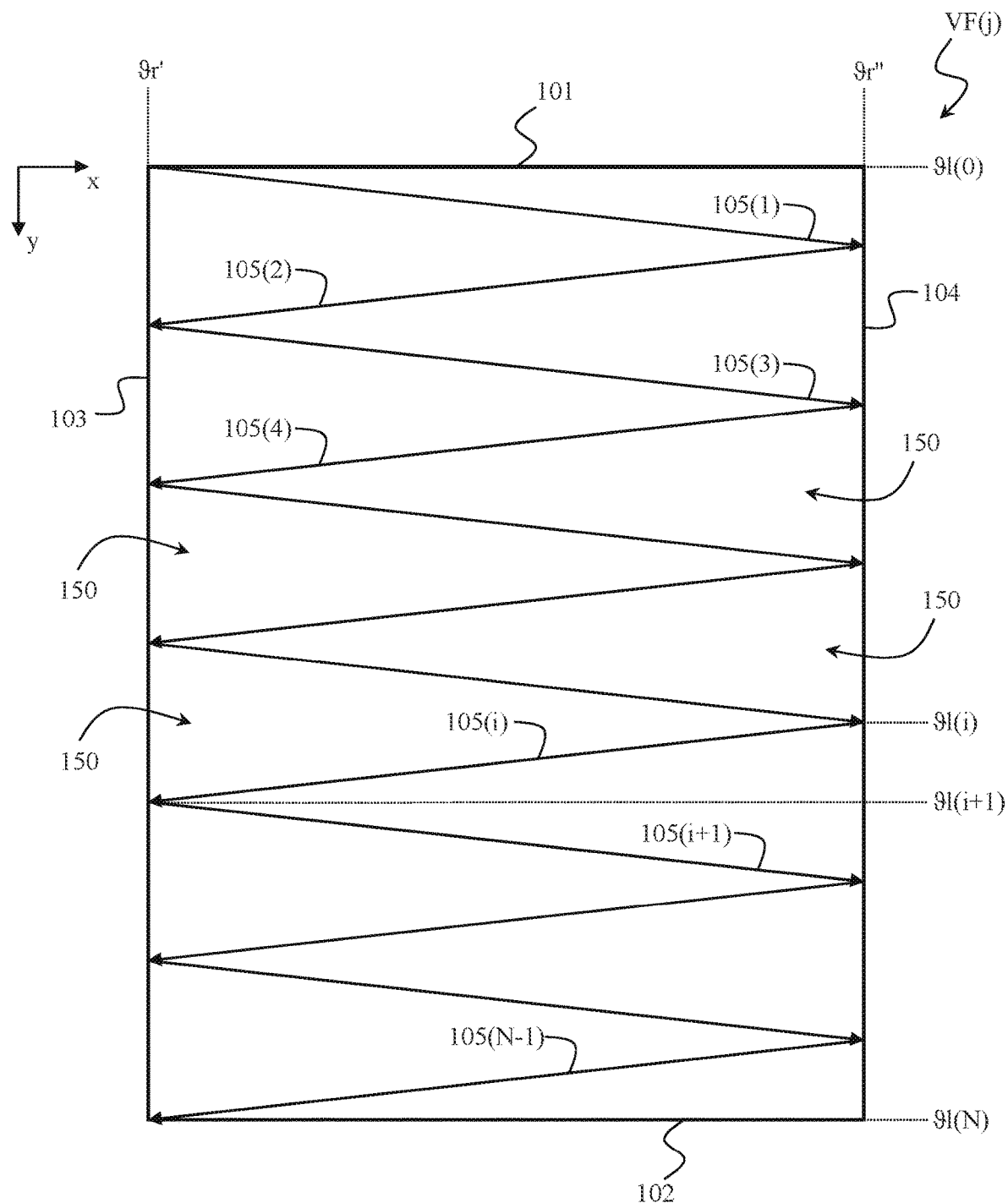
FIG. 1 illustrates scanning lines of an exemplary video frame.

By making reference to FIG. 1, wherein the horizontal direction is identified with x and the vertical direction is identified with y, and a generic (rectangular) video frame VF(j) comprises a first horizontal side 101, a second horizontal side 102, a first vertical side 103 and a second vertical side 104, the laser beam is steered to project the video frame VF(j) according to a zigzag pattern 105, comprising a sequence of N interconnected scanning lines 105(i) (i=0 to N−1) extending from the first vertical side 103 to the opposite second vertical side 104 of the video frame VF(j) with a component along the horizontal direction x and a component along the vertical direction y. A MEMS mirror is configured so as to have its resonant axis parallel to the horizontal direction x and its linear axis parallel to the vertical direction y. Naturally, similar considerations apply in case the directions x and y are switched to each other, and/or the zigzag pattern 105 is rotated by 90° with respect to the exemplary one illustrated in FIG. 1.

It is pointed out that the rectangular projection of the video frame VF(j) given by the linear scanning trajectory illustrated in FIG. 1, with perfectly straight scanning lines 105(i), is a simplified idealization, since in practice, there will be some distortion (in jargon, "Keystone distortion"), which will be then typically be compensated by a laser management module and by a video processor module. In any case, the concepts of the present disclosure, and generally what is described in the present document, are unaffected by the presence of possible distortion.

During the projection of a generic video frame VF(j), each scanning line 105(i) is projected by driving the MEMS mirror:

along its resonant axis so as the resonant deflection angle $\vartheta r$ moves from a first resonant deflection angle value $\vartheta r'$ (corresponding to a position along the horizontal direction x at the first vertical side 103) to a second resonant deflection angle value $\vartheta r''$ (corresponding to a position along the horizontal direction x at the second vertical side 104), or vice versa; and at the same time along its linear axis so as the linear deflection angle $\vartheta r$ moves from a respective first linear deflection value $\vartheta l(i-1)$ (corresponding to a position along the vertical direction y) to a respective second linear deflection value $\vartheta l(i)$ (corresponding to a position along the vertical direction y higher than the position along the vertical direction y of the deflection value $\vartheta l(i-1)$).

In this way, each video frame VF(j) is projected by having the MEMS mirror repeatedly and rapidly oscillating about its resonant axis between the first resonant deflection angle value $\vartheta r'$ and the second resonant deflection angle value $\vartheta r''$ (for the odd scanning lines 105(i) (i=1, 3, 5, 7, . . . )) or between the second resonant deflection angle value $\vartheta r''$ and the first resonant deflection angle value, $\vartheta r'$ (for the even scanning lines 105(i) (i=2, 4, 6, 8, . . . )) at the resonant frequency fr, while gradually and slowly rotating about its linear axis between a start linear deflection value $\vartheta l(0)$ (corresponding to a position along the vertical direction y at the first horizontal side 102 of the video frame VF(j)) to a end linear deflection value $\vartheta l(N-1)$ (corresponding to a position along the vertical direction y at the second horizontal side 102 of the video frame VF(j)).

Once the entire video frame VF(j) has been projected, e.g., once a last scanning line 105(N) has been traced, and the end linear deflection value $\vartheta l(N-1)$ has been reached, the MEMS mirror is rapidly rotated about its linear axis in such a way to bring back the linear deflection angle $\vartheta l$ to the start linear deflection value $\vartheta l(0)$, in order to restart from a position along the vertical direction y at the first horizontal side 102 of the next video frame VF(j+1).

Given a video streaming providing for repetition of video frame V(j) at a corresponding video frame rate Vf, the corresponding video frame period Tf=1/Vf may be thus subdivided into:

a first sub-period, referred to as "trace period" Vt(j), during which the N scanning lines 105(i) (i=0 to N−1) are projected to project the generic video frame V(j); and a second sub-period, referred to as "retrace period" Rt(j), during which the linear deflection angle $\vartheta l$ of the MEMS mirror is reset to the top linear deflection value $\vartheta l(0)$.

Figure 2:
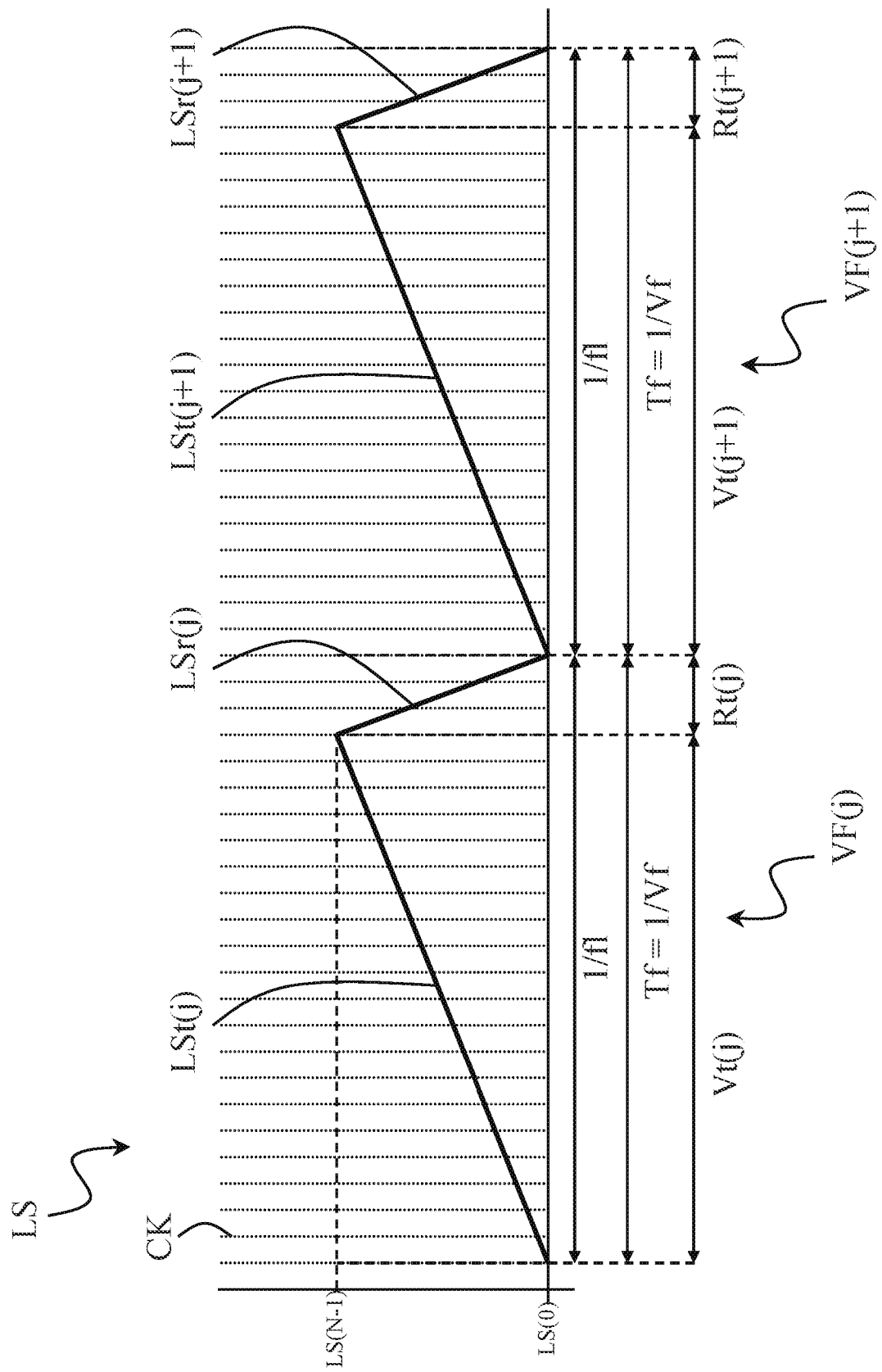
FIG. 2 is a time diagram showing an exemplary linear axis driving signal during the projection of two consecutive video frames.

FIG. 2 is a time diagram showing an exemplary linear axis driving signal LS oscillating at linear frequency fl during the projection of two consecutive video frames VF(j), VF(j+1) according to a solution known in the art.

The linear axis driving signal LS is a periodic signal being the periodical repetition with period 1/fl of a signal segment SS(j) of duration 1/fl, said signal segment having a corresponding shape S providing for a trace segment LSt(j) corresponding to the trace period Vt(j) and a retrace segment LSr(j) corresponding to the retrace period Rt(j).

During the trace period Vt(j) of the video frame period Tf of the video frame VF(j), the trace segment LSt(j) increases from a start value LS(0) corresponding to the start linear deflection value $\vartheta l(0)$ until reaching an end value LS(N−1) corresponding to the end linear deflection value $\vartheta l(N-1)$.

During the retrace period Rt(j), retrace segment LSr(j) decreases from the end value LS(N) back to the start value LS(0). Then, the linear axis driving signal LS repeats the same course for the video frame period Tf of the next video frame VF(j+1).

Therefore, the linear axis driving signal LS is a periodic signal that is set to oscillate at the video frame rate Vf=1/Tf(fl=Vf).

It is pointed out that while the linear axis driving signal LS has been illustrated in FIG. 2 as comprising a straight trace segment LSt(j) and a straight retrace segment LSr(j), similar considerations apply in case:

during the trace period Vt(j), the trace segment LSt(j) increases from LS(0) to LS(N−1) in a non-linear way; and/or during the retrace period Rt(j), the retrace segment LSr(j) decreases from LS(N) to LS(0) in a non-linear way.

For example, the retrace segment LSr(j) may be shaped in such a way to avoid the formation of a cusp at the connection with the following trace segment LSt(j+1).

Since there is a proportional relationship between the linear axis driving signal LS and the linear deflection angle fl, the MEMS mirror thus oscillates about its linear axis with a linear frequency fl equal to the video frame rate Vf.

According to a solution known in the art, the linear frequency fl is a submultiple of the resonance frequency fr, e.g., fl=2*fr/M, wherein M is an integer. Since during the trace period Vt(j) a new scanning line 105(i) is traced every time period corresponding to half of the inverse of the resonance frequency fr, and N scanning lines 105(i) are traced, the trace period Vt(j) is equal to N/(2*fr), while the retrace period Rt(j) is equal to L/(2*fr), where L=M−N is an integer.

According to solutions known in the art, the periodic linear axis driving signal LS—comprising at each period 1/fl a signal segment SS(j) comprising the trace segment LSt(j) and the retrace segment LSr(j)—is an analog signal obtained by converting through a Digital-to-Analog Converter (DAC) a set of digital values L(m) stored in a table (linear axis driving table). The sequence of digital values L(m) defines the shape S of the signal segment SS(j) repeated at each period 1/fl.

According to solutions known in the art, the linear axis driving table comprises a sequence of M values L(m) (m=0, 1, . . . , M), each one configured to be fed to a DAC every time an (e.g., rising or falling) edge of a resonant axis clock signal CK oscillating at the resonant frequency fr (or at an integer multiple of fr) is reached. In other words, the clock signal CK synchronizes the provision of the sequence of M values L(m) to the DAC converter with the resonant axis driving signal RS, e.g., with the oscillation of the MEMS mirror about its resonant axis. In FIG. 2, the resonant axis clock signal CK edges are depicted with a dotted line.

The sequence of M values L(m) (m=0, 1, . . . , M) stored in the linear axis driving table comprises a first sub-sequence of N values L(m) (m=0, 1, . . . , N−1) corresponding to the trace segment LSt(j) of the signal segment SS(j) and a second sub-sequence of L values L(m) (m=N, N+1, M) corresponding to the retrace segment LSr(j) of the signal segment SS(j).

Having the linear frequency fl that is a submultiple of the resonance frequency fr causes the positions of the scanning lines 105(i) to be fixed for every projected video frame VF(j), so that empty spaces (generically identified in FIG. 1 with reference 150) are always in the same position within each projected video frame VF(j).

According to a solution known in the art, the empty spaces are reduced by increasing the number of scanning lines 105(i) per each video frame VF(j) by increasing the resonance frequency fr.

According to another solution known in the art, the empty spaces 150 are reduced by increasing the number of scanning lines 105(i) by transmitting different group of scanning lines (e.g., odd and even scanning lines) on alternated video frames VF(j) through an interlacing technique.

Moreover, since the resonant frequency fr and the video frame rate Vf may be subjected to unforeseeable changes, having the linear frequency fl that is a submultiple of the resonance frequency fr may cause synchronization problems caused by misalignment between the actual video frame rate Vf and the linear frequency fl.

A straightforward known solution to manage this frequency change is to dynamically recalculate the second sub-sequence of L values L(m) (m=N, N+1, M) of the linear axis driving table in order to dynamically vary (e.g., stretch or expand) the retrace portion LSr(j) of the linear axis driving signal LS for each video frame VF(j). This approach, however, requires many samples in the table, and the number of samples varies for each VF(j).

Figure 3:
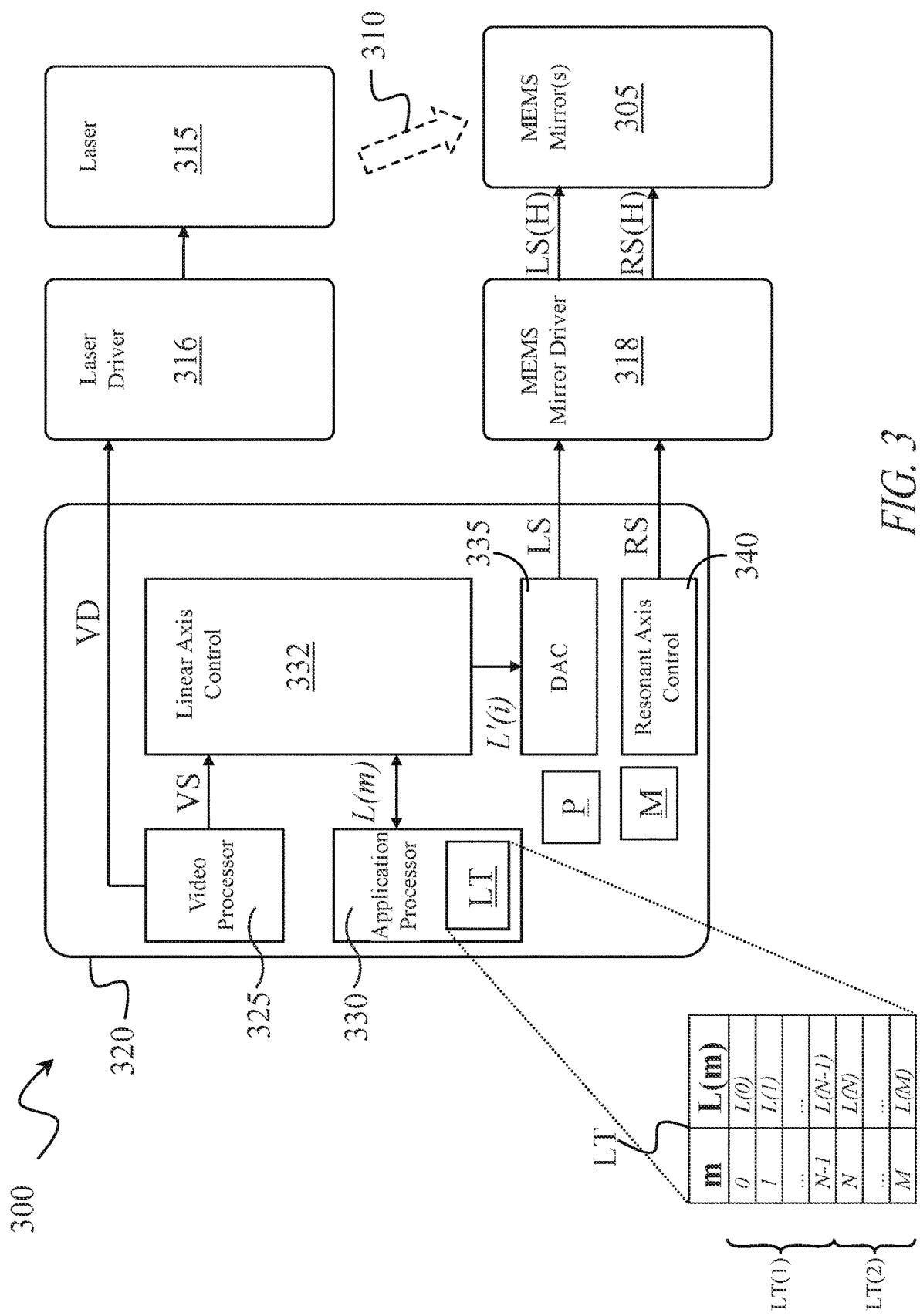
FIG. 3 schematically illustrates in terms of very simplified functional blocks, a Laser Beam Scanning system wherein concepts according to embodiments of the present disclosure can be applied.

FIG. 3 schematically illustrates in terms of very simplified functional blocks, a Laser Beam Scanning (LBS) system 300 wherein concepts according to embodiments of the present disclosure can be applied.

The LBS system 300 comprises one or more MEMS mirrors 305 adapted to steer laser beam(s) 310 generated by a laser module 315 driven through a laser driver module 316 according to a video data signal VD for projecting video frames V(F(j)) at a video frame rate Vf.

For this purpose, the LBS system 300 comprises a MEMS mirror driving module 318 configured to properly rotate the MEMS mirror(s) 305 about the linear and the resonant axis according to a linear axis driving signal LS and a resonant axis driving signal RS, respectively.

As already described above, the resonant axis driving signal RS is, for example, a sine-wave or a square-wave signal oscillating at the resonant frequency fr of the MEMS mirror, while the linear axis driving signal LS is a periodic signal being the periodical repetition with period 1/fl of a signal segment SS(j) of duration 1/fl.

The MEMS mirror driving module 318 is for example configured to generate a high voltage version LS(H) of the received linear axis driving signal LS and a high voltage version RS(H) of the received resonant axis driving signal RS, and feed such high voltage versions LS(H), RS(H) of the linear axis driving signal LS and resonant axis driving signal RS to the MEMS mirror(s) 305.

The LBS system 300 according to an embodiment of the present disclosure comprises a main processing unit 320, such as a processing core or other processing circuitry P and one or more memories M, including:

A video processor module or circuit 325 configured to generate the video data signal VD and a video frame sync signal VS corresponding to a video synchronization defining the video frame rate Vf.

An application processor module or circuit 330 configured to store and manage a linear axis driving table LT memorizing a sequence of digital values L(m) defining a preliminary shape S of the signal segment SS(j) of the linear axis driving signal LS repeated at each period 1/fl. As already mentioned above, the linear axis driving table LT stores a sequence of M digital values L(m) (m=0, 1, . . . , M). The linear axis driving table LT comprises a first section LT(1) storing a first sub-sequence of N values L(m) (m=0, 1, . . . , N−1) corresponding to the trace segment LSt(j) of the signal segment SS(j), and a second section LT(2) storing a second sub-sequence of L values L(m) (m=N, N+1, . . . , M) corresponding to the retrace segment LSr(j) of the signal segment SS(j). According to an embodiment of the present disclosure illustrated in the figures, the shape S of the signal segment SS(j) provides for a straight increasing trace segment LSt(j) followed by a straight decreasing retrace segment LSr(j). However similar considerations apply to different shapes, such as for example an increasing straight trace segment LSt(j) followed by a decreasing parabolic retrace segment LSr(j) (for example including two parabolic segments). According to an embodiment of the present disclosure, the shape S of the signal segment SS(j) is such that the duration in time of the trace segment LSt(j) is larger than the duration in time of the retrace segment LSr(j). For example, the duration in time of the trace segment LSt(j) may correspond to about 90% of the total time duration of the signal segment SS(j) (and therefore the duration in time of the retrace segment LSr(j) may correspond to about 10% of the total time duration).

According to an embodiment of the present disclosure, the sequence of M digital values L(m) is obtained by sampling the signal segment SS(j) having the shape S with a sampling frequency corresponding to the lowest possible value fr_min of the resonance frequency fr, so that to have the lowest number M of digital values L(m) (m=0, 1, ..., M), with 2*fr_min/fl=M. Once the number M of digital values is determined, the table size may be fixed, in contrast to the solution described above, in which the number of samples varies for each VF(j).

A linear axis control module or circuit 332 adapted to process the set of digital values L(m) based on the video frame sync signal VS in order to generate a sequence of processed digital values L(i)' defining a processed shape S' corresponding to a potentially reshaped version of the preliminary shape S to be used for the generation of the linear axis driving signal LS as will be described in the following.

A DAC module or circuit 335 configured to convert the sequence of processed digital values L(i)' into an analogue linear axis driving signal LS being the periodical repetition with period 1/fl of a signal segment SS(j) of duration 1/fl, the signal segment SS(j) having a shape corresponding to the processed shape S'.

A resonant axis driving signal generator module or circuit 340 configured to generate the resonant axis driving signal RS. It has to be appreciated that the resonant axis driving signal RS is used for the generation of the resonant axis clock signal CK, wherein the resonant axis clock signal CK is used as a time basis for the operation of the main processing unit 320.

According to an embodiment of the present disclosure that will be described in detail in the following, the linear axis control module or circuit 332 is configured to reshape the preliminary shape S of the signal segment SS(j) (and particularly, the time duration thereof) into a processed shape S' such to dynamically adapt the linear frequency fl of the linear axis driving signal LS to a value that matches the actual video frame rate Vf. As will be described in following, the matching between the linear frequency fl of the linear axis driving signal LS to a value that matches the actual video frame rate Vf is obtained starting always from a same set of data, e.g., the digital values L(m) stored in the linear axis driving table LT, reducing thus the computational burden of the system.

Figure 4:
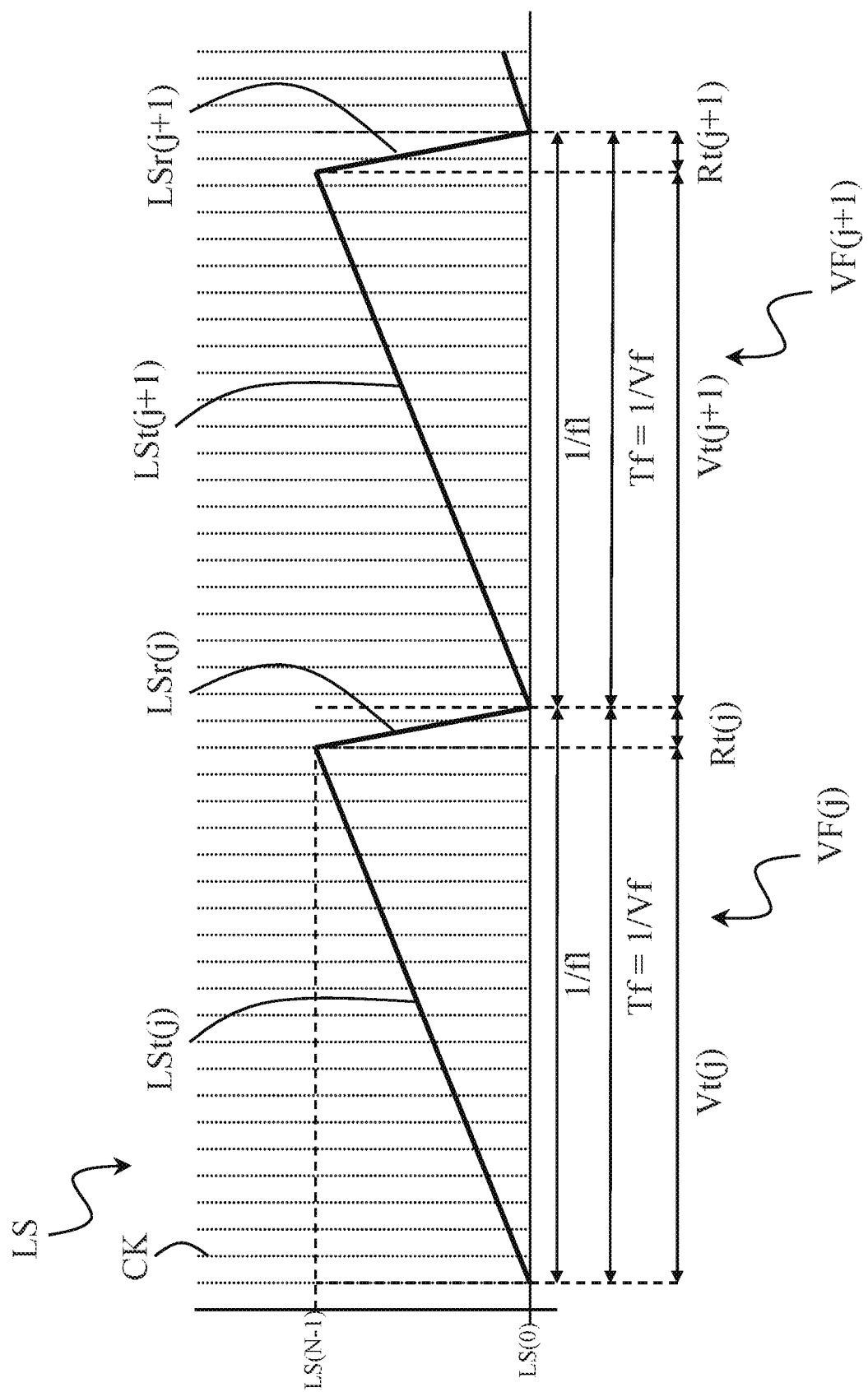
FIG. 4 illustrates an exemplary reshaping of signal segments of the linear axis driving signal according to an embodiment of the present disclosure.

By making reference to FIG. 4, according to an embodiment of the disclosure, the reshaping of the preliminary shape S into the processed shape S' carried out by the linear axis control module 332 is such that the linear frequency fl is set to a value corresponding to the resonant frequency fr divided by a factor M' (fl=fr/M'), wherein M' is a real number. In other words, according to an embodiment of the present disclosure, the restriction of the known solutions that provides for having the linear frequency fl that is an integer submultiple of the resonant frequency fr is no more applied. In this way, a good and precise matching between the linear frequency fl and the actual video frame Vf can be obtained. Moreover, having the factor M' that is a real number allows to implement an interlacing of an arbitrary number of frames, increasing thus the coverage of the projected video frame VF(j).

It is pointed out that the concepts of the present disclosure can be directly applied to a case in which the video processor module 325 is not included in the main processing unit 320. Moreover, similar considerations apply if some of the modules or circuits included in the main processing unit 320 are included/embedded in different and separated circuits, such as for example different Application Specific Integrated Circuits (ASICs).

Figure 5:
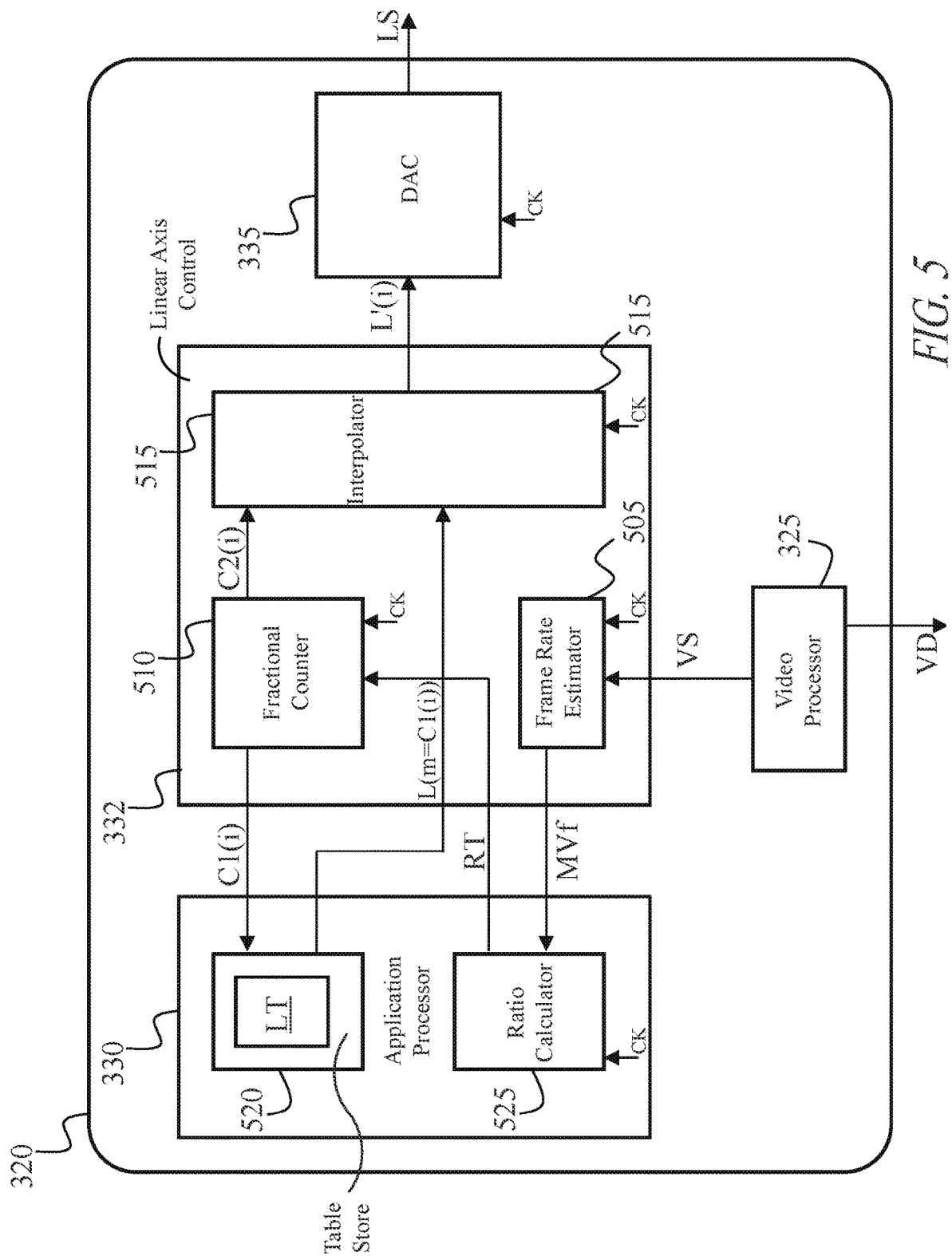
FIG. 5 schematically illustrates in terms of functional blocks some sub-modules of the system of FIG. 3 according to an embodiment of the present disclosure.

In order to describe in greater detail how the linear axis control module 332 operates for dynamically adapting the linear frequency fl of the linear axis driving signal LS to a value that matches the actual video frame rate Vf through a reshaping of the preliminary shape S according to an embodiment of the present disclosure, reference will be now made to FIG. 5. FIG. 5 schematically illustrates in terms of functional blocks some sub-modules or circuits of the application processor module 330 and of the linear axis control module 332 and the way they interact with the video processor module 325 and the DAC module 335 during the operations for dynamically adapting the linear frequency fl of the linear axis driving signal LS to a value that matches the actual video frame rate Vf according to an embodiment of the present disclosure.

The linear axis control module 332 comprises a video frame rate estimator sub-module or circuit 505, a fractional counter sub-module circuit 510 and an interpolator sub-module or circuit 515. The application processor module 330 comprises a table sub-module or circuit 520 (adapted to store the linear axis driving table LT) and a ratio calculator sub-module or circuit 525. The operations of the video frame rate estimator sub-module 505, the fractional counter sub-module 510, the interpolator sub-module 515 and the ratio calculator sub-module 525 are synchronized with a same resonant axis clock signal CK oscillating at the resonant frequency fr of the MEMS mirror 305 or to an integer multiple thereof (e.g., 2*fr).

According to an embodiment of the present disclosure, the linear frequency fl of the linear axis driving signal LS is dynamically adapted to a value that matches the actual video frame rate Vf by reshaping the preliminary shape S to the processed shape S' through an interpolation of the digital values L(m). According to an embodiment of the present disclosure, this interpolation is carried out by the interpolator sub-module 515 by taking into account the value of a so-called expansion ratio RT—generated by the ratio calculator sub-module 525 according to the actual video frame rate Vf—indicative of an expansion degree (in terms of time duration) of the processed shape S' of the signal segment SS(j) with respect to the time duration of the preliminary shape S.

According to an embodiment of the present disclosure, the interpolator sub-module 515, at each (e.g., rising or falling) i-th edge of the resonant axis clock signal CK, calculates a processed digital value L(i)' from a group G(i) of received input digital values L(m) using a corresponding interpolation function IF that interpolates the group G(i) of input digital values L(m). As will be described in the following, according to an embodiment of the present disclosure, the fractional counter sub-module 510 is configured to set the position P(i) across the interpolation function IF with respect to the group G(i) of input digital values L(m) for calculating the processed digital value L(i)' according to the expansion ratio RT. Since according to an embodiment of the present disclosure, the processed digital value L(i)' is regularly output at each (e.g., rising or falling) edge of the resonant axis clock signal CK, by varying the expansion ratio RT, and thus by varying the position P(i) across the interpolation function IF with respect to the group G(i) of input digital values L(m), it is possible to vary the processed digital value L(i)' obtained from the same group G(i) of received input digital values L(m). In other words, it is possible to reshape the preliminary shape S to a processed shape S' while using always the same set of input digital values L(m), in a straightforward way by changing the expansion ratio RT. In addition, because the expansion ration RT may be a real number having an arbitrary resolution, the ratio between the CK frequency and the video frame rate is not limited to integer ratios.

According to an embodiment of the present disclosure, the video frame rate estimator sub-module 505 is configured to receive from the video processor module 325 the video frame sync signal VS and accordingly output a video frame rate measure MVf indicative of a measure of the actual video frame rate Vf of the video frame sync signal VS. According to an embodiment of the present disclosure, the video frame rate measure MVf is calculated as the number of pulses (or ticks) CK(i) of the resonant axis clock signal CK counted from the beginning to the end of a video frame VF(j).

According to an embodiment of the present disclosure, the video frame rate measure MVf is provided to the ratio calculator sub-module 525 each time a new video frame VF(j) is started.

According to an embodiment of the present disclosure, the ratio calculator sub-module 525 is configured to receive the video frame rate measure MVf and to accordingly calculate the expansion ratio RT. According to an embodiment of the present disclosure, the time duration (and therefore the inverse of the linear frequency fl) of the signal segment SS(j) having the processed shape S' corresponds to the time duration of the preliminary shape S multiplied by the inverse of the expansion ratio RT. In this way, when the expansion ratio RT is equal to 1, the processed shape S' of the signal segment SS(j) corresponds to the preliminary shape S, and when the expansion ratio RT is lower than 1, the processed shape S' of the signal segment SS(j) corresponds to an expanded version of the preliminary shape S.

According to an embodiment of the present disclosure, when the ratio calculator sub-module 525 is receiving the resonant axis clock signal CK pulses CK(i) corresponding to the trace segment LSt(j) of the signal segment SS(j), it sets the expansion ratio RT to 1, or more generally to a constant value.

According to an embodiment of the present disclosure, in order to synchronize the linear frequency fl with the video frame rate Vf, when the ratio calculator sub-module 525 is receiving the resonant axis clock signal CK pulses CK(i) corresponding to the retrace segment LSr(j) of the signal segment SS(j), it sets the expansion ratio RT to a value equal to a ratio between:
  the number L of digital values in the second section LT(2) of the linear axis driving table LT (e.g., the one storing the second sub-sequence L(m) (m=N, N+1, . . . , M) corresponding to the retrace segment LSr(j) of the signal segment SS(j)); and
  the number L minus a frequency error correction term FCT indicative of an offset between the linear frequency fl and the video frame rate Vf, wherein the frequency error correction term FCT is equal to the number L minus the video frame rate measure MVf (the number of pulses CK(i) of the resonant axis clock signal CK counted from the beginning to the end of the video frame VF(j)).

According to another embodiment of the present disclosure, the expansion ratio RT may be generally set to a value equal to a ratio between:
  the length (duration) of the trace segment LSt(j) of the signal segment SS(j) having the preliminary shape S corresponding to the digital values L(m) stored in the linear axis driving table LT; and
  a desired length (duration) of the trace segment LSt(j) of the signal segment SS(j) having the processed shape S'.

According to an embodiment of the present disclosure, the fractional counter sub-module 510 is configured to calculate a base counter BC that is incremented, at each resonant axis clock signal CK pulse CK(i), by a value corresponding to the actual value of the expansion ratio RT.

According to an embodiment of the present disclosure, the fractional counter sub-module 510 is configured to in such a way that, at each resonant axis clock signal CK pulse CK(i):
  a counter value C1(i) corresponding to the integer part of the base counter BC is sent to the table sub-module 520; and
  a counter value C2(i) corresponding to the fractional part of the base counter BC is sent to the interpolator sub-module 515.

According to an embodiment of the present disclosure, at each resonant axis clock signal CK pulse CK(i), the table sub-module 520 selects from the linear axis driving table LT a corresponding digital value L(m) identified by an index m equal to the counter value C1(i), and send the selected digital value L(m=C1(i)) to the interpolator sub-module 515.

In this way, according to an embodiment of the present disclosure, at each resonant axis clock signal CK pulse CK(i), the interpolator sub-module 515 receives a counter value C2(i) and a selected digital value L(m=C1(i)).

According to an embodiment of the present disclosure, the interpolator sub-module 515 is configured to calculate at each i-th resonant axis clock signal CK pulse CK(i), a processed digital value L(i)', obtained by interpolating a group G(i) of digital values L(m=C1(i), L(m=C1(i)−1), . . . received at a corresponding set of resonant axis clock signal CK pulses CK(i), CK(i−1), . . . , using a corresponding interpolation function IF that interpolates the group G(i) of input digital values L(m) and using the counter value C2(i) to set the position P(i) across the interpolation function IF with respect to the group G(i) of input digital values L(m) for calculating the processed digital value L(i)'.

Figure 6:
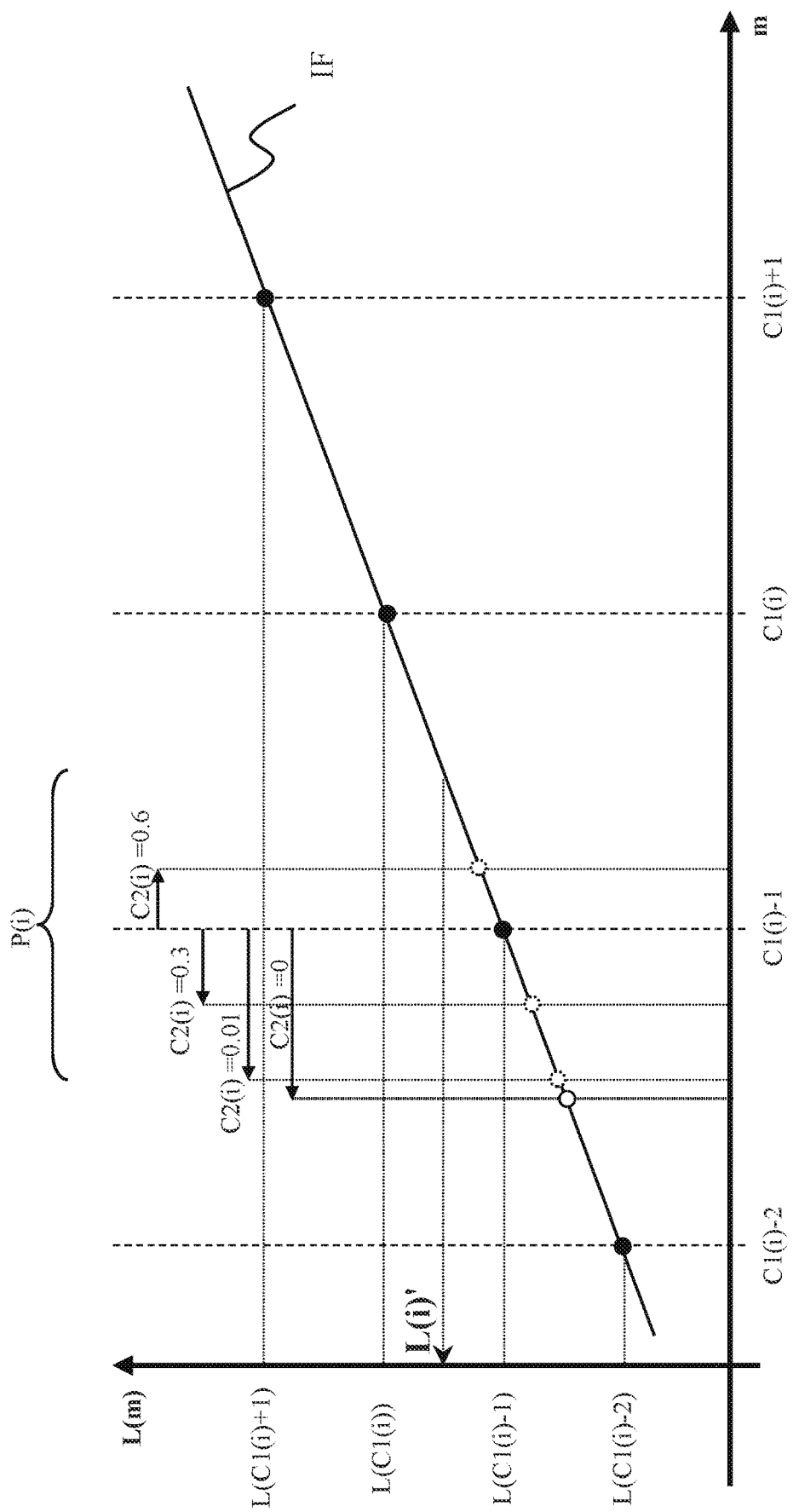
FIG. 6 schematically illustrate how an interpolator sub-module according to an embodiment of the present disclosure calculates a processed digital value.

FIG. 6 schematically illustrate an example of how the interpolator sub-module 515 according to an embodiment of the present disclosure calculates at the generic i-th resonant axis clock signal CK pulse CK(i) a processed digital value L(i)' from a group G(i) of (e.g., three) digital values L(m=C1(i)−2), L(m=C1(i)−1), L(m=C(i)) using an interpolation function IF that interpolates the group G(i) of digital values L(m).

According to an embodiment of the present disclosure, the counter value C2(i) sets the position P(i) across the interpolation function IF with respect to the digital value L(m=C1(i)−1) for calculating the corresponding processed digital value L(i).

According to an embodiment of the present disclosure, when the counter value C2(i) is equal to zero (this will always occur when the expansion ratio RT is equal 1), the position P(i) across the interpolation function IF for calculating the processed digital value L(i)' is in the middle point between L(C1(i)−1) and L(C1(i)).

According to an embodiment of the present disclosure, when the counter value C2(i) is different than zero (this can occur only if the expansion ratio RT is lower than 1), the position P(i) across the interpolation function IF for calculating the processed digital value L(i)' is moved back with respect to the case in which the counter value C2(i) is equal to zero, by an amount which depend on the counter value C2(i). In the example illustrated in FIG. 6, the positions P(i) corresponding to different counter values C2(i) are shown (C2(i)=0, C2(i)=0.6, C2(i)=0.3, and C2(i)=0.01).

Since the interpolation function IF illustrated in the example of FIG. 6 is an increasing function, moving back the position P(i) causes in turn a lowering of the corresponding processed digital value L(i)'. Naturally, the concepts of the present disclosure applies also to other kinds of interpolation functions IF, which can be increasing, decreasing or also comprising both increasing and decreasing portions.

Figure 7A:
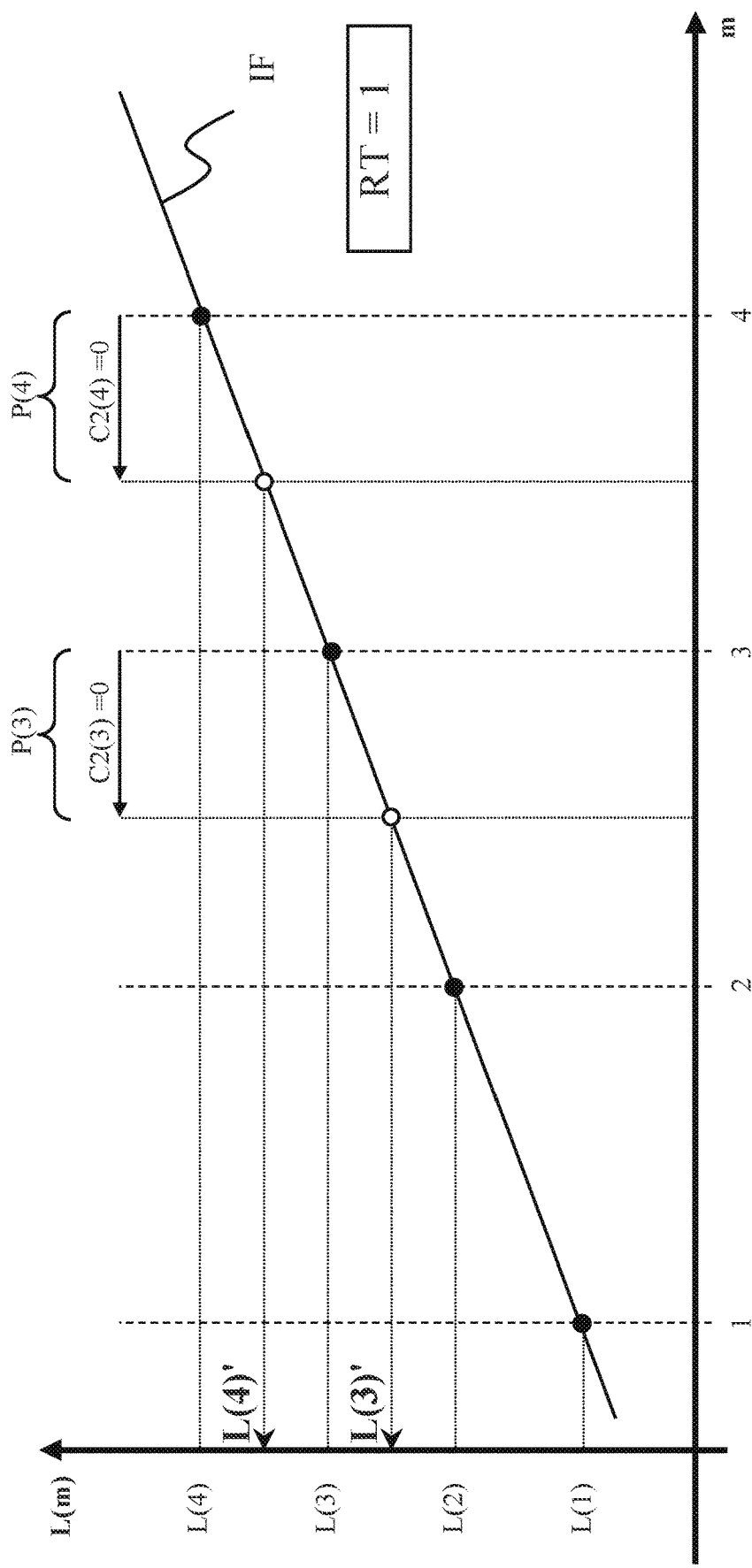
FIGS. 7A and 7B schematically illustrate two examples of how the interpolator sub-module according to an embodiment of the present disclosure calculates the processed digital value.
Figure 7B:
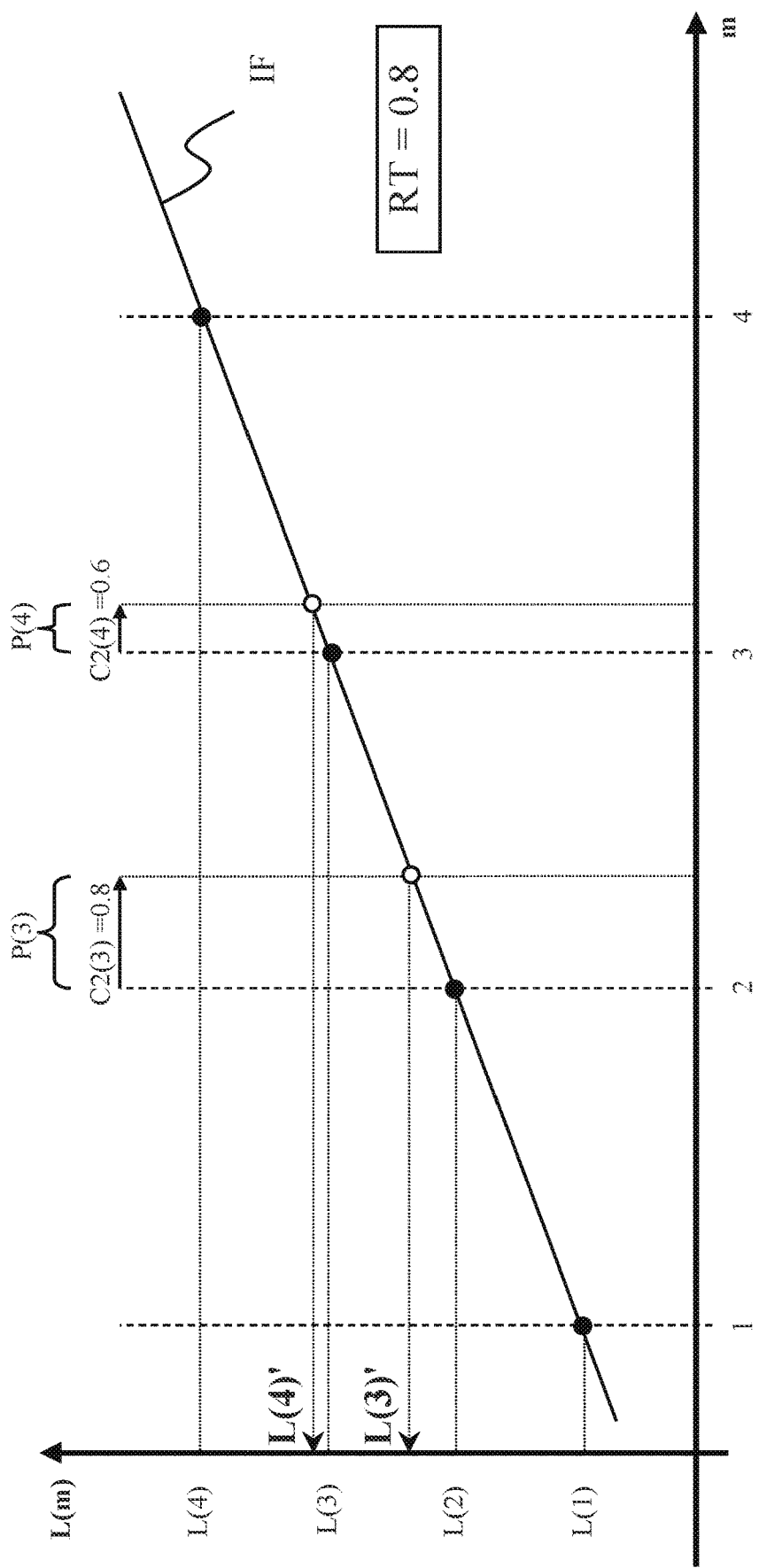

FIGS. 7A and 7B schematically illustrate examples of how the interpolator sub-module 515 according to an embodiment of the present disclosure calculates the processed digital value L(i)' when the expansion ratio RT is equal to 1 (FIG. 7A) and when the expansion ratio RT is equal to 0.8 (FIG. 7B).

The example illustrated in FIG. 7A shows the generation of the processed digital value L(3)' from a group G(3) of digital values L(2), L(3), L(4) and the generation of the processed digital value L(4)' from a group G(4) of digital values L(3), L(4), L(5). In the illustrated example, the counter value C2(3) corresponding to the resonant axis clock signal CK pulse CK(3) sets the position P(3) across the interpolation function IF with respect to the digital value L(3) for calculating the processed digital value L(3)', while the counter value C2(4) corresponding to the resonant axis clock signal CK pulse CK(4) sets the position P(4) across the interpolation function IF with respect to the digital value L(4) for calculating the processed digital value L(4)'.

The example illustrated in FIG. 7B shows the generation of the processed digital value L(3)' from a group G(3) of digital values L(1), L(2), L(3) and the generation of the processed digital value L(4)' from a group G(4) of digital values L(2), L(3), L(4).

In the illustrated example, the counter value C2(3) corresponding to the resonant axis clock signal CK pulse CK(3) sets the position P(3) across the interpolation function IF with respect to the digital value L(2) for calculating the processed digital value L(3)', while the counter value C2(4) corresponding to the resonant axis clock signal CK pulse CK(4) sets the position P(4) across the interpolation function IF with respect to the digital value L(3) for calculating the processed digital value L(4)'.

When the expansion ratio RT is equal to 1 (see FIG. 7A), the counter value C2(i) is always equal to zero. In this case, according to an embodiment of the present disclosure, the position P(3) across the interpolation function IF for calculating the processed digital value L(3)' is in the middle point between L(2) and L(3), and the position P(4) across the interpolation function IF for calculating the processed digital value L(4)' is in the middle point between L(3) and L(4).

When the expansion ratio RT is equal to 0.8 (see FIG. 7B), the counter value C2(i) may assume values different than zero. In the example at issue, the counter value C2(3) corresponding the resonant axis clock signal CK pulse CK(3) is equal to 0.8, and the counter value C2(4) corresponding the following resonant axis clock signal CK pulse CK(4) is equal to 0.6. For this reason, the positions P(3) and P(4) will result located backward compared to the respective positions P(3), P(4) calculated with the expansion ratio RT equal to 1, and therefore the processed digital values L(3)' and L(4)' will be lower compared to the processed digital values L(3)' and L(4)' calculated with the counter value C2(i) equal to zero.

Figure 8:
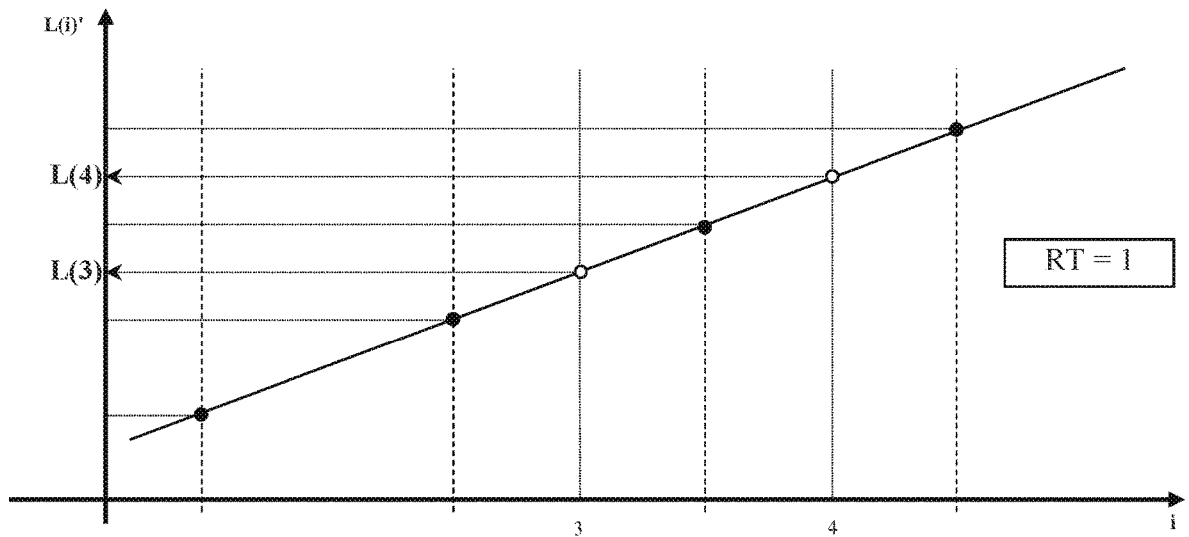
FIG. 8 schematically illustrate how the slope of a curve fitting processed digital valued varies depending on an expansion ratio according to embodiments of the present disclosure.
Figure 8:
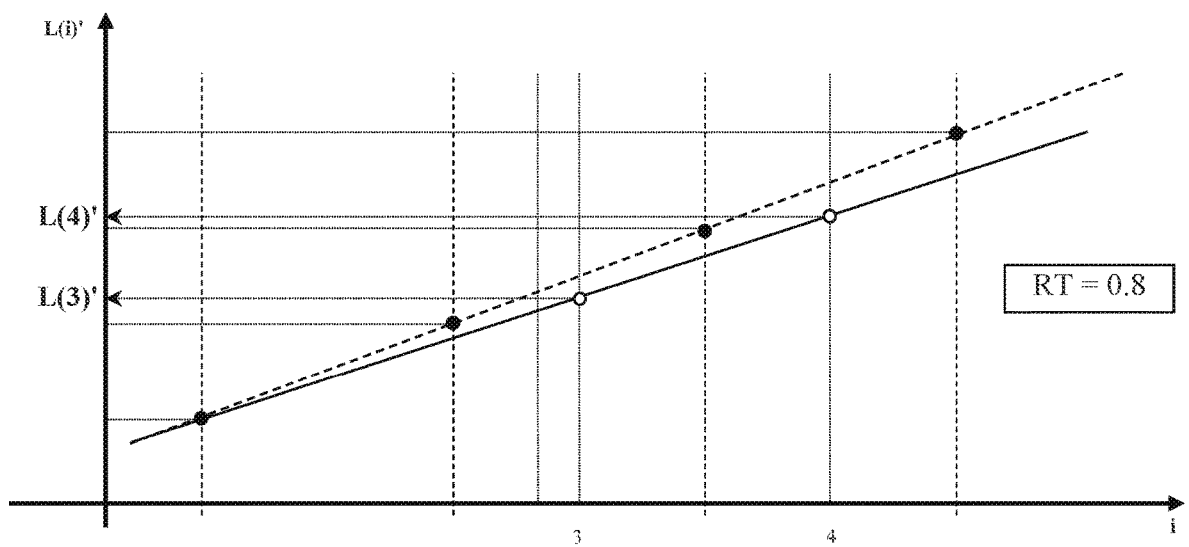

By making reference to the exemplary embodiment of the present disclosure illustrated in FIGS. 6, 7A and 7B:

the processed digital values L(i)' are regularly output by the interpolator sub-module 515 at each i-th resonant axis clock signal CK pulse CK(i); and when the expansion ratio RT is lower than 1, the processed digital value L(i)' has a lower value compared to the case in which the expansion ratio is equal to 1, the resulting slope of the curve fitting the processed digital values L(i)' outputted by the interpolator sub-module 515 at each resonant axis clock signal CK pulse CK(i) is lowered compared to the case in which the counter value C2(i) is always equal to zero, such as when the expansion ratio RT is equal to 1. An example of this effect can be seen in FIG. 8, showing the cases of expansion ratio RT equal to 1 (upper portion of the figure) and equal to 0.8 (lower portion of the figure).

A direct consequence of this behavior is that, in order to reach a determined maximum MEMS mirror angle (which may be predetermined), when the expansion ratio RT is lower than 1, a higher number of processed values L(i)' will be generated.

According to an exemplary but not limitative embodiment of the disclosure, the interpolator sub-module 515 is a second order interpolator configured to output at each resonant axis clock signal CK pulse CK(i) a processed digital value L(i)' equal to: $FIR0=C01*L(C1(i))+C02*L(C1(i)-1)+C03*L(C1(i)-2)$ $FIR1=C11*L(C1(i))+C12*L(C1(i)-1)+C13*L(C1(i)-2)$ $FIR2=C21*L(C1(i))+C22*L(C1(i)-1)+C23*L(C1(i)-2)$ $L(i)'=((FIR2*C2(i))+FIR1)*C2(i)+FIR0$ wherein C01, C02, C03, C11, C12, C13, C21, C22, C23 are parameters.

While in the description reference has been made to a specific implementation of the interpolator sub-module 515, the concepts of the present disclosure can be applied to different kinds of interpolators. In an embodiment the bandwidth of the interpolators is such to efficiently suppress spectral replicas of the signal corresponding to the sequence of digital values L(C1(i)) fed to the interpolator, and they can process and manage numbers with a fractional resolution (e.g., the number of bits employed for representing fractional part values) of at least 10 bits (for example, equal to 14 bits). Polynomial or parametric interpolators are particularly suited to be used in this kind of application, while polyphase FIR interpolators might require the management of a very huge number of coefficients in order to obtain a sufficient high fractional resolution. For example, the disclosure has been tested using a second-order polynomial interpolator having a frequency response of $(\sin(f)/f)^k$, with k=3.

According to an embodiment of the present disclosure, at each resonant axis clock signal CK pulse CK(i), a corresponding processed digital value L(i)' is fed to the DAC module 335.

The DAC module 335 converts the sequence of processed digital values L(i)' into an analogue linear axis driving signal LS being the periodical repetition of a signal segment SS(j) having a shape (and particularly a time duration) corresponding to the processed shape S'.

According to an embodiment of the present disclosure, the processed shape S' generated by the DAC module 335 has a linear frequency fl equal to the frequency of the signal segment SS(j) having the preliminary shape S defined by the digital values L(m) stored in the linear axis driving table LT divided by M', where M' is the average value of the expansion ratio RT computed within a video frame period Tf=1/Vf. When the average M' of the expansion ratio RT calculated in a video frame period Tf is equal to 1, the processed shape S' is equal to the preliminary shape S, and therefore the linear frequency fl of the linear axis driving signal LS is kept unchanged. When the average M' of the expansion ratio RT calculated in a video frame period Tf is lower than 1, the processed shape S' is a stretched version of the preliminary shape S, and therefore the linear frequency fl of the linear axis driving signal LS is lowered.

According to an embodiment of the present disclosure, the signal segment SS(j) having the processed shape S' output by the DAC module 335 comprises:
- a trace segment LSt(j) having the same shape of the one corresponding to the preliminary shape S; and
- a retrace segment LSr(j) which can be set to a stretched-out version of the one corresponding to the preliminary shape S according to the expansion ratio RT. The trace segment may be stretched out, for example, by a constant factor, and does not need to be stretched out by a factor based on the video frame rate.

In this way, the generic segment SS(j) of the linear axis driving signal LS having the processed shape S' will have a trace period Vt(j) equal to the one corresponding to the preliminary shape S, and a retrace period Rt(j) that can be adjusted according to the expansion ratio RT to became longer than the one corresponding to the preliminary shape S.

Having the trace period Vt(j) corresponding to the processed shape S' that is equal to the one corresponding to the preliminary shape S, avoids the occurrences of undesired drifts or artifacts during the projections of the video frames V(F(j)).

According to an embodiment of the present disclosure, the retrace period Rt(j) is instead adjusted (by varying the expansion ratio RT) so as to adjust to an extent such that the linear frequency fl is matching the video frame rate Vf.

It is underlined that all the above mentioned results are obtained with the main processing unit 320 that operates synchronized to the resonant axis clock signal CK irrespective of the number of the scanning lines to be projected. If a higher and/or a fractional number of scanning lines is required, only the shape of the signal segment SS(j) may be varied, while the resonant axis clock signal CK is not altered.

Solutions according to various embodiments of the present disclosure have the advantage that they can be applied to any kind of preliminary shape S, that can be easily defined through the digital values L(m) stored in the linear axis driving table LT without the need of using specific mathematical formulas, since the reshaping of the preliminary shape S is carried out by the interpolator sub-module 515 starting from the digital values L(m).

The concepts of the present disclosure can be advantageously used also in a biresonant raster scan systems in which instead of having a linear axis and a resonant axis, two resonant axis are provided, namely a first resonant axis, and a second resonant axis, wherein the first resonant axis, referred to as "mechanical axis", has a frequency that is smaller than the one of the second resonant axis, such as for example ¹⁄₁₀ (these kind of systems are also known as Lissajous systems). In this case, while the second resonant axis will be driven in a resonance condition to follow resonance frequency variations, the first, (mechanical) resonant axis will be instead driven in a quasi resonant condition, e.g., with a fixed frequency that corresponds to the resonance frequency of the first resonant axis only nominally. Since the value of the resonance frequency of the first resonant axis is fixed and smaller than the frequency of the second resonant axis, by defining a preliminary shape S storing proper digital values L(m) in the linear axis driving table LT and calculating an expansion ratio RT with the same interpolator sub-module 515, it is possible to generate a first resonant axis drive signal with a frequency which tracks with the second resonant axis clock signal CK, which is in turn linked to the resonance frequency fr.

According to an embodiment of the present disclosure, in order to compensate possible phase offsets between the linear frequency fl and the video frame rate Vf, the ratio calculator sub-module 525 may advantageously set the expansion ratio RT corresponding to a video frame VF(j) to a value equal to a ratio between:
- the number L of digital values in the second section LT(2) of the linear axis driving table LT (the one storing the second sub-sequence L(m) (m=N, N+1, . . . , M) corresponding to the retrace segment LSr(j) of the signal segment SS(j)); and the number L, minus the frequency correction term FCT, plus a phase error correction term PCT, wherein the phase error correction term PCT is equal to zero during the projection of odd video frames VU(j) (j=1, 3, 5, 7 . . . ), and to the number of pulses (or ticks) CK(i) of the resonant axis clock signal CK counted from the beginning of a video frame VF(j) and a rising edge of the video frame sync signal VS during the projection of even video frames V(j) (j=2, 4, 6, 8 . . . ).

With this approach, video interlacing can be advantageously carried out with any number of interlaced phases, without limitations. For example:
- if the number of scanning lines 105(i) is even, no interlacing is required;
- if the number of scanning lines 105(i) is odd, a 2-phase interlacing can be employed;
- if the number of scanning lines 105(i) is equal to an even number plus ½, a 4-phase interlacing can be employed; and
- if the number of scanning lines 105(i) is equal to an even number plus ⅓, a 6-phase interlacing can be employed, and so on.

Therefore, since according to the embodiments of the disclosure the preliminary shape S can be reshaped to a processed shape S' which can also correspond to a not integer number of scanning lines 105(i), it is advantageously possible to carry out interlacing without having to alter the linear axis driving table LT, and therefore also independently from the resonance frequency fr (and therefore also independently from the resonant axis clock signal CK).

Naturally, in order to satisfy local and specific requirements, a person skilled in the art may apply to the solution described above many logical and/or physical modifications and alterations. More specifically, although the present disclosure has been described with a certain degree of particularity with reference to example embodiments thereof, it should be understood that various omissions, substitutions and changes in the form and details as well as other embodiments are possible. In particular, different embodiments of the disclosure may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the disclosure may be incorporated in other embodiments.

A system for driving at least one MEMS mirror (305) adapted to steer a laser beam (310) generated according to a video data signal (VD) for projecting video frames (V(j)) at a corresponding video frame rate Vf, the at least one MEMS mirror (305) being configured to rotate about a linear axis with a linear frequency fl and about a resonant axis with a resonant frequency fr, the system may be summarized as including a linear axis control module (332) adapted to receive a sequence of digital values L(m) defining a preliminary shape version S of a signal segment SS(j) and to reshape said preliminary shape version S into a processed shape version S' by processing said digital values according to a video frame sync signal (VS) corresponding to a video synchronization defining the video frame rate Vf, said linear frequency fl being equal to the inverse of the time duration of said signal segment SS(j) having said processed shape version S'; and a MEMS mirror driving module (318) configured to rotate said at least one MEMS mirror (305) about the linear axis according to a linear axis driving signal (LS) being the periodical repetition, with a period equal to the inverse of the linear frequency fl, of said signal segment SS(j) having said processed shape version S', wherein the linear axis control module (332) is configured to reshape said preliminary shape version S into said processed shape version S' to adapt the linear frequency fl to a value matching the video frame rate Vf.

The linear axis control module (332) may be configured to generate said processed shape version S' of the signal segment SS(j) in such a way to set the linear frequency fl to a value corresponding to the resonant frequency fr divided by a factor M', wherein said factor M' is a real number.

The linear axis control module (332) may be configured to generate said processed shape version S' of the signal segment SS(j) by generating a corresponding sequence of processed digital values L(i)' defining said processed shape version S' through an interpolation of said digital values L(m).

The linear axis control module (332) may be configured to calculate, at an edge of a clock signal (CK) oscillating at the resonant frequency fr or at an integer multiple of the resonant frequency fr, a processed digital value L(i)' from a group G(i) of digital values L(m) using an interpolation function IF interpolating said group G(i) of digital values L(m), the linear axis control module (332) being configured to set a position P(i) across said interpolation function IF with respect to the group G(i) of digital values L(m) for calculating the processed digital value L(i)' according to an expansion ratio (RT) indicative of an expansion degree in terms of time duration of the processed shape version S' of the signal segment SS(j) with respect to the time duration of the preliminary shape version S of the signal segment SS(j).

The system may further include a video frame rate estimator module (505) configured to receive said video frame sync signal (VS) and accordingly calculate a video frame rate measure (MVf) indicative of a measure of an actual video frame rate Vf of the video data signal (VD); and a ratio calculator module (525) configured to calculate said expansion ratio (RT) according to said video frame rate measure (MVf).

The linear axis control module (332) may be configured to set the time duration of the signal segment SS(j) having the processed shape version S' to a value corresponding to the time duration of the signal segment SS(j) having the preliminary shape version S' multiplied by the inverse of the expansion ratio (RT).

The signal segment SS(j) may include a trace segment (LSt(j)) corresponding to clock signal (CK) pulses during which the at least one MEMS mirror (305) is moved for steering the laser beam (310) in order to project scanning lines 105(i) of a corresponding video frame (V(j)); and a retrace segment (LSr(j)) corresponding to clock signal (CK) pulses during which a position of the at least one MEMS mirror (305) about the linear axis is reset, wherein said sequence of digital values L(m) defining the preliminary shape version S of the signal segment SS(j) includes a first subsequence (LT(1)) of digital values L(m) corresponding to the trace segment (LSt(j)) and a second subsequence (LT(2)) of digital values L(m) corresponding to the retrace segment (LSr(j)).

The ratio calculator module (525) may be configured to set said expansion ratio (RT) to one during clock signal (CK) pulses corresponding to the trace segment (LSt(j)).

The ratio calculator module (525) may be configured to set said expansion ratio (RT) to a ratio between a number of digital values L(m) of the first subsequence (LT(1)) of digital values L(m); and said number of digital values L(m) of the first subsequence (LT(1)) of digital values L(m) minus a frequency error correction term FCT indicative of an offset between the linear frequency fl and the video frame rate Vf, during clock signal (CK) pulses corresponding to the retrace segment (LSr(j)).

Said frequency error correction term FCT may be equal to said number of digital values L(m) of the first subsequence (LT(1)) of digital values L(m) minus said video frame rate measure (MVf).

The linear axis control module (332) may include a fractional counter module (510) configured to calculate a base counter BC that is incremented at each clock signal (CK) pulse by a value corresponding to an actual value of the expansion ratio (RT), and to output at each clock signal (CK) pulse a corresponding first counter value (C1(i)) corresponding to the integer part of the base counter BC and a corresponding second counter value (C2(i)) corresponding to the fractional part of the base counter BC; and an interpolator module (515) configured to select at each clock signal (CK) said group G(i) of digital values L(m) among the sequence of digital values L(m) according to said first counter value (C1(i)), and to calculate a corresponding processed digital value L(i)' using said interpolation function IF interpolating said group G(i) of digital values L(m) by setting said position P(i) across said interpolation function IF with respect to the group G(i) of digital values L(m) according to said second counter value (C2(i)).

A Laser beam scanning system (300) may be summarized as including a laser module (315) configured to generate a laser beam (310); a laser drive module (316) configured to drive the laser module (315) according to a video data signal (VD); at least one MEMS mirror (305) adapted to steer said laser beam (310) for projecting video frames (V(j)) at a corresponding video frame rate Vf; and a system for driving said at least one MEMS mirror (305) such as one of the systems described herein.

In an embodiment, a device comprises: memory; and processing circuitry coupled to the memory, wherein, in operation, the processing circuitry: generates a resonant axis drive signal to drive a Micro Electro Mechanical System (MEMS) mirror system at a resonance frequency; and generates a linear axis drive signal to drive the MEMS mirror system at a linear frequency corresponding to a video frame rate, the generating the linear axis drive signal including generating, using interpolation, a current set of shape values based on a stored set of shape values and an indication of the video frame rate, and generating the linear axis drive signal using the current set of shape values. In an embodiment, the linear frequency is a non-integer multiple of the resonance frequency. In an embodiment, the processing circuitry, in operation, generates the current set of shape values by interpolating the stored set of shape values based on the indication of the video frame rate. In an embodiment, the processing circuitry, in operation, generates a current shape value of the set of current shape values, corresponding to an edge of a clock signal having an oscillating frequency based on the resonance frequency, based on an expansion ratio indicative of an expansion degree with respect to a time duration corresponding to the stored set of shape values and a time duration corresponding to the current set of shape values. In an embodiment, the processing circuitry, in operation: generates a video frame rate measure indicative of a measure of an actual video frame rate of a video data signal; and determines the expansion ratio according to the video frame rate measure. In an embodiment, the processing circuitry, in operation: sets a time duration of a signal segment corresponding to the set of current shape values to a value corresponding to a time duration of a signal segment corresponding to the set of stored shape values multiplied by an inverse of the expansion ratio. In an embodiment, a signal segment SS(j) comprises: a trace segment corresponding to clock signal pulses during which the MEMS mirror system is moved along a linear axis to steer a laser beam to project scanning lines 105(i) of a corresponding video frame; and a retrace segment corresponding to clock signal pulses during which a position of the MEMS mirror system about the linear axis is reset, wherein the set of current shape values comprises a first subset of digital values corresponding to the trace segment and a second subset of digital values corresponding to the retrace segment. In an embodiment, the processing circuitry, in operation, sets the expansion ratio to a constant value (e.g., to one) during clock signal pulses corresponding to the trace segment. In an embodiment, the processing circuitry, in operation, sets the expansion ratio to a ratio between: a number of digital values of the first subset of digital values L(m); and the number of digital values of the first subset of digital values minus a frequency error correction term indicative of an offset between the linear frequency and the video frame rate, during clock signal pulses corresponding to the retrace segment. In an embodiment, the frequency error correction term is equal to the number of digital values of the first subset of digital values minus the video frame rate measure. In an embodiment, the processing circuitry, in operation: calculates a base counter that is incremented at each clock signal pulse by a value corresponding to an actual value of the expansion ratio; outputs at each clock signal pulse a corresponding first counter value corresponding to an integer part of the base counter and a corresponding second counter value corresponding to a fractional part of the base counter; selects at each clock signal a group of digital values among the stored set of shape values according to the first counter value; and calculates a corresponding current shape value by interpolating the group of digital values by setting a position with respect to the group of digital values according to the second counter value. In an embodiment, a system comprises: a laser subsystem; a Micro Electro Mechanical System (MEMS) mirror subsystem; and processing circuitry coupled to the laser subsystem and to the MEMS mirror subsyste, wherein, in operation, the processing circuitry: generates a resonant axis drive signal to drive the MEMS mirror system at a resonance frequency; and generates a linear axis drive signal to drive the MEMS mirror system at a linear frequency corresponding to a video frame rate, the generating the linear axis drive signal including generating, using interpolation, a current set of shape values based on a stored set of shape values and an indication of the video frame rate, and generating the linear axis drive signal using the current set of shape values. In an embodiment, the linear frequency is a non-integer multiple of the resonance frequency. In an embodiment, the processing circuitry, in operation, generates the current set of shape values by interpolating the stored set of shape values based on the indication of the video frame rate. In an embodiment, the processing circuitry, in operation, generates a current shape value of the set of current shape values, corresponding to an edge of a clock signal having an oscillating frequency based on the resonance frequency, based on an expansion ratio indicative of an expansion degree with respect to a time duration corresponding to the stored set of shape values and a time duration corresponding to the current set of shape values.

In an embodiment, a method comprises: generating a resonant axis drive signal to drive a Micro Electro Mechanical System (MEMS) mirror system at a resonance frequency; generating a linear axis drive signal to drive the MEMS mirror system at a linear frequency corresponding to a video frame rate, the generating the linear axis drive signal including generating, using interpolation, a current set of shape values based on a stored set of shape values and an indication of the video frame rate, and generating the linear axis drive signal using the current set of shape values; and driving the MEMS mirror system using the resonant axis drive signal and the linear axis drive signal. In an embodiment, the linear frequency is a non-integer multiple of the resonance frequency. In an embodiment, the method comprises: generating the current set of shape values by interpolating the stored set of shape values based on the indication of the video frame rate. In an embodiment, the method comprises: generating a current shape value of the set of current shape values, corresponding to an edge of a clock signal having an oscillating frequency based on the resonance frequency, based on an expansion ratio indicative of an expansion degree with respect to a time duration corresponding to the stored set of shape values and a time duration corresponding to the current set of shape values.

In an embodiment, a non-transitory computer-readable medium's contents configure a processing system to perform a method, the method comprising: generating a resonant axis drive signal to drive a Micro Electro Mechanical System (MEMS) mirror system at a resonance frequency; generating a linear axis drive signal to drive the MEMS mirror system at a linear frequency corresponding to a video frame rate, the generating the linear axis drive signal including generating, using interpolation, a current set of shape values based on a stored set of shape values and an indication of the video frame rate, and generating the linear axis drive signal using the current set of shape values; and driving the MEMS mirror system using the resonant axis drive signal and the linear axis drive signal. In an embodiment, the method comprises: generating the current set of shape values by interpolating the stored set of shape values based on the indication of the video frame rate. In an embodiment, the contents comprise instructions, which, when executed by the processing system, cause the processing system to perform the method. In an embodiment, the contents comprise a lookup table storing the stored set of shape values.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
   memory; and
   processing circuitry coupled to the memory, wherein, in operation, the processing circuitry:
   generates a resonant axis drive signal to drive a Micro Electro Mechanical System (MEMS) mirror system at a resonance frequency; and
   generates a linear axis drive signal to drive the MEMS mirror system at a linear frequency corresponding to a video frame rate, the generating the linear axis drive signal including generating, using interpolation, a current set of shape values based on a stored set of shape values and an indication of the video frame rate, and generating the linear axis drive signal using the current set of shape values.

2. The device of claim 1, wherein the linear frequency is a non-integer multiple of the resonance frequency.

3. The device of claim 1, wherein the processing circuitry, in operation, generates the current set of shape values by interpolating the stored set of shape values based on the indication of the video frame rate.

4. The device of claim 3, wherein the processing circuitry, in operation, generates a current shape value of the set of current shape values, corresponding to an edge of a clock signal having an oscillating frequency based on the resonance frequency, based on an expansion ratio indicative of an expansion degree with respect to a time duration corresponding to the stored set of shape values and a time duration corresponding to the current set of shape values.

5. The device of claim 4, wherein the processing circuitry, in operation:
   generates a video frame rate measure indicative of a measure of an actual video frame rate of a video data signal; and
   determines the expansion ratio according to the video frame rate measure.

6. The device of claim 5, wherein the processing circuitry, in operation:
   sets a time duration of a signal segment corresponding to the set of current shape values to a value corresponding to a time duration of a signal segment corresponding to the set of stored shape values multiplied by an inverse of the expansion ratio.

7. The device of claim 6, wherein a signal segment SS(j) comprises:
   a trace segment corresponding to clock signal pulses during which the MEMS mirror system is moved along a linear axis to steer a laser beam to project scanning lines of a corresponding video frame; and
   a retrace segment corresponding to clock signal pulses during which a position of the MEMS mirror system about the linear axis is reset, wherein
   the set of current shape values comprises a first subset of digital values corresponding to the trace segment and a second subset of digital values corresponding to the retrace segment.

8. The device of claim 7, wherein the processing circuitry, in operation, sets the expansion ratio to a constant value during clock signal pulses corresponding to the trace segment.

9. The device of claim 8, wherein the processing circuitry, in operation, sets the expansion ratio to a ratio between:
   a number of digital values of the first subset of digital values L(m); and
   the number of digital values of the first subset of digital values minus a frequency error correction term indicative of an offset between the linear frequency and the video frame rate, during clock signal pulses corresponding to the retrace segment.

10. The device of claim 9, wherein the frequency error correction term is equal to the number of digital values of the first subset of digital values minus the video frame rate measure.

11. The device of claim 10, wherein the processing circuitry, in operation:
    calculates a base counter that is incremented at each clock signal pulse by a value corresponding to an actual value of the expansion ratio;
    outputs at each clock signal pulse a corresponding first counter value corresponding to an integer part of the base counter and a corresponding second counter value corresponding to a fractional part of the base counter;
    selects at each clock signal a group of digital values among the stored set of shape values according to the first counter value; and
    calculates a corresponding current shape value by interpolating the group of digital values by setting a position with respect to the group of digital values according to the second counter value.

12. A system, comprising:
    a laser subsystem;
    a Micro Electro Mechanical System (MEMS) mirror subsystem; and
    processing circuitry coupled to the laser subsystem and to the MEMS mirror subsystem, wherein, in operation, the processing circuitry:
    generates a resonant axis drive signal to drive the MEMS mirror system at a resonance frequency; and
    generates a linear axis drive signal to drive the MEMS mirror system at a linear frequency corresponding to a video frame rate, the generating the linear axis drive signal including generating, using interpolation, a current set of shape values based on a stored set of shape values and an indication of the video frame rate, and generating the linear axis drive signal using the current set of shape values.

13. The system of claim 12, wherein the linear frequency is a non-integer multiple of the resonance frequency.

14. The system of claim 12, wherein the processing circuitry, in operation, generates the current set of shape values by interpolating the stored set of shape values based on the indication of the video frame rate.

15. The system of claim 14, wherein the processing circuitry, in operation, generates a current shape value of the set of current shape values, corresponding to an edge of a clock signal having an oscillating frequency based on the resonance frequency, based on an expansion ratio indicative of an expansion degree with respect to a time duration corresponding to the stored set of shape values and a time duration corresponding to the current set of shape values.

16. A method, comprising:
    generating a resonant axis drive signal to drive a Micro Electro Mechanical System (MEMS) mirror system at a resonance frequency;
    generating a linear axis drive signal to drive the MEMS mirror system at a linear frequency corresponding to a video frame rate, the generating the linear axis drive signal including generating, using interpolation, a current set of shape values based on a stored set of shape values and an indication of the video frame rate, and generating the linear axis drive signal using the current set of shape values; and
    driving the MEMS mirror system using the resonant axis drive signal and the linear axis drive signal.

17. The method of claim 16, wherein the linear frequency is a non-integer multiple of the resonance frequency.

18. The method of claim 16, comprising:
    generating the current set of shape values by interpolating the stored set of shape values based on the indication of the video frame rate.

19. The method of claim 18, comprising:
    generating a current shape value of the set of current shape values, corresponding to an edge of a clock signal having an oscillating frequency based on the resonance frequency, based on an expansion ratio indicative of an expansion degree with respect to a time duration corresponding to the stored set of shape values and a time duration corresponding to the current set of shape values.

20. A non-transitory computer-readable medium having contents which configure a processing system to perform a method, the method comprising:
    generating a resonant axis drive signal to drive a Micro Electro Mechanical System (MEMS) mirror system at a resonance frequency;
    generating a linear axis drive signal to drive the MEMS mirror system at a linear frequency corresponding to a video frame rate, the generating the linear axis drive signal including generating, using interpolation, a current set of shape values based on a stored set of shape values and an indication of the video frame rate, and generating the linear axis drive signal using the current set of shape values; and
    driving the MEMS mirror system using the resonant axis drive signal and the linear axis drive signal.

21. The non-transitory computer-readable medium of claim 20, wherein the method comprises:
    generating the current set of shape values by interpolating the stored set of shape values based on the indication of the video frame rate.

22. The method of claim 20, wherein the contents comprise instructions, which, when executed by the processing system, cause the processing system to perform the method.

23. The method of claim 20, wherein the contents comprise a lookup table storing the stored set of shape values.

* * * * *